United States Patent
Hu et al.

(10) Patent No.: US 11,456,634 B2
(45) Date of Patent: Sep. 27, 2022

(54) ROTOR STRUCTURE, PERMANENT MAGNET ASSISTED SYNCHRONOUS RELUCTANCE MOTOR AND ELECTRIC CAR

(71) Applicant: Gree Electric Appliances, Inc. of Zhuhai, Guangdong (CN)

(72) Inventors: Yusheng Hu, Guangdong (CN); Bin Chen, Guangdong (CN); Yong Xiao, Guangdong (CN); Suhua Lu, Guangdong (CN); Tong Tong, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 160 days.

(21) Appl. No.: 16/971,567

(22) PCT Filed: Dec. 7, 2018

(86) PCT No.: PCT/CN2018/119824
§ 371 (c)(1),
(2) Date: Aug. 20, 2020

(87) PCT Pub. No.: WO2019/214225
PCT Pub. Date: Nov. 14, 2019

(65) Prior Publication Data
US 2020/0395799 A1     Dec. 17, 2020

(30) Foreign Application Priority Data
May 8, 2018   (CN) .......................... 201810433995.9

(51) Int. Cl.
*H02K 1/27*           (2022.01)
*H02K 1/276*         (2022.01)
(Continued)

(52) U.S. Cl.
CPC ........... *H02K 1/2766* (2013.01); *H02K 1/246* (2013.01); *H02K 15/03* (2013.01); *H02K 19/02* (2013.01); *H02K 29/03* (2013.01)

(58) Field of Classification Search
CPC ...... H02K 1/2766; H02K 1/246; H02K 15/03; H02K 19/02; H02K 29/03; H02K 2213/03; Y02T 10/64
See application file for complete search history.

(56) References Cited

U.S. PATENT DOCUMENTS 7,459,821 B2    12/2008   Ho Cheong et al.
2012/0200186 A1    8/2012   Sano et al.
(Continued)

FOREIGN PATENT DOCUMENTS

CN          1741354 A     3/2006
CN        202586554 U    12/2012
(Continued)

*Primary Examiner* — Thomas Truong
(74) *Attorney, Agent, or Firm* — The Webb Law Firm (57) ABSTRACT

The present disclosure provides a rotor structure, a permanent magnet assisted synchronous reluctance motor and an electric car. The rotor structure includes: a rotor body opened with a group of permanent magnet slots, wherein the group of permanent magnet slots include an inner-layer permanent magnet slot and an outer-layer permanent magnet slot which are arranged at intervals outwards along a radial direction of the rotor body; an inner-layer permanent magnet disposed within the inner-layer permanent magnet slot; an outer-layer permanent magnet disposed within the outer-layer permanent magnet slot, wherein the inner-layer permanent magnet and the outer-layer permanent magnet are arranged staggeredly.

10 Claims, 7 Drawing Sheets

(51) Int. Cl.
*H02K 1/24* (2006.01)
*H02K 15/03* (2006.01)
*H02K 19/02* (2006.01)
*H02K 29/03* (2006.01)

(56) References Cited

U.S. PATENT DOCUMENTS

2013/0113325 A1* 5/2013 Saito .................. H02K 1/2706
                                                    310/156.12
2013/0307363 A1   11/2013 Sano et al.
2018/0241262 A1*  8/2018 Tang .................... H02K 21/14
2019/0165627 A1*  5/2019 Michaelides .......... H02K 1/278

FOREIGN PATENT DOCUMENTS

| | | |
|---|---|---|
| CN | 104600890 A | 5/2015 |
| CN | 104810945 A | 7/2015 |
| CN | 104638863 B | 7/2016 |
| CN | 108429375 A | 8/2018 |
| CN | 208241424 U | 12/2018 |
| DE | 102010010434 A1 | 9/2011 |
| GB | 2551537 A | 12/2017 |
| JP | 2000270525 A | 9/2000 |
| JP | 2008306849 A | 12/2008 |

\* cited by examiner

ROTOR STRUCTURE, PERMANENT MAGNET ASSISTED SYNCHRONOUS RELUCTANCE MOTOR AND ELECTRIC CAR

CROSS-REFERENCE TO RELATED APPLICATIONS

This application is the United States national phase of International Application No. PCT/CN2018/119824 filed Dec. 7, 2018, and claims priority to Chinese Patent Application No. 201810433995.9 filed May 8, 2018, the disclosures of which are hereby incorporated by reference in their entirety.

BACKGROUND OF THE INVENTION

Field of the Invention

The present disclosure relates to the technical field of devices of an electric car, in particular, to a rotor structure, a permanent magnet assisted synchronous reluctance motor, and an electric car.

Description of Related Art

The electric car which has characteristics such as energy saving and environmental protection, has developed rapidly. In order to realize the functions of the driving motor of electric car known to the inventors, such as high power density and high efficiency, more and more electric motors employ high-performance rare earth permanent magnet motors. The rare earth permanent magnet motors which can achieve high efficiency and high power density, mainly depend on high-performance rare earth permanent magnets, among which neodymium iron boron rare earth permanent magnets are the most widely used at present. However, rare earth is a non-renewable resource with a more expensive price, and the price of rare earth also fluctuates greatly, thereby resulting in a higher production cost of a driving motor of an electric car. Further, a ferrite permanent magnet assisted synchronous reluctance motor is also applied to an electric car in the art known to the inventors.

SUMMARY OF THE INVENTION

According to one aspect of the present disclosure, a rotor structure is provided. The rotor structure includes: a rotor body opened with a group of permanent magnet slots, wherein the group of permanent magnet slots include an inner-layer permanent magnet slot and an outer-layer permanent magnet slot which are arranged at intervals outwards along a radial direction of the rotor body; an inner-layer permanent magnet disposed within the inner-layer permanent magnet slot; an outer-layer permanent magnet disposed within the outer-layer permanent magnet slot, wherein the inner-layer permanent magnet and the outer-layer permanent magnet are arranged staggeredly.

In some embodiments, the rotor structure further includes: a first magnetic isolation bridge, wherein a first end of the first magnetic isolation bridge is connected to a first slot wall of the inner-layer permanent magnet slot, a second end of the first magnetic isolation bridge is connected to a second slot wall of the inner-layer permanent magnet slot opposite to the first slot wall, and the first magnetic isolation bridge and the outer-layer permanent magnet are arranged oppositely.

In some embodiments, a length of the outer-layer permanent magnet is L, a thickness of the outer-layer permanent magnet along a radial direction is D, and a width of the first magnetic isolation bridge along a length direction of the inner-layer permanent magnet slot is L1, where $0.02 \leq L1/(L \times D) \leq 0.1$.

In some embodiments, the rotor structure further includes: a second magnetic isolation bridge, wherein a first end of the second magnetic isolation bridge is connected to a third slot wall of the outer-layer permanent magnet slot, a second end of the second magnetic isolation bridge is connected to a fourth slot wall of the outer-layer permanent magnet slot opposite to the third slot wall, and the second magnetic isolation bridge and the inner-layer permanent magnet are arranged oppositely.

In some embodiments, there are two second magnetic isolation bridges, which are respectively disposed within both ends of the outer-layer permanent magnet slot.

In some embodiments, the inner-layer permanent magnet includes: a first permanent magnet disposed within a first end of the inner-layer permanent magnet slot; a second permanent magnet disposed within a second end of the inner-layer permanent magnet slot, wherein the first permanent magnet and the second permanent magnet are arranged with a distance therebetween, and the outer-layer permanent magnet is located between the first permanent magnet and the second permanent magnet.

In some embodiments, a first end and a second end of the inner-layer permanent magnet slot are arranged to extend toward an outer edge of the rotor body along a radial direction of the rotor body, the first end of the inner-layer permanent magnet slot and the second end of the inner-layer permanent magnet slot are arranged oppositely and located on both sides of a direct-axis of the rotor body, a first end and a second end of the outer-layer permanent magnet slot are arranged to extend toward the outer edge of the rotor body along the radial direction of the rotor body, the first end of the outer-layer permanent magnet slot and the second end of the outer-layer permanent magnet slot are arranged oppositely and located on both sides of the direct-axis, the first end of the inner-layer permanent magnet slot and the first end of the outer-layer permanent magnet slot are arranged adjacently, and a distance between the first end of the inner-layer permanent magnet slot and the first end of the outer-layer permanent magnet slot gradually increases outwards along the radial direction of the rotor body, or a distance between the second end of the inner-layer permanent magnet slot and the second end of the outer-layer layer permanent magnet slot gradually increases outwards along the radial direction of the rotor body; or
a distance between the first end of the inner-layer permanent magnet slot and the first end of the outer-layer permanent magnet slot gradually increases outwards along the radial direction of the rotor body, and a distance between the second end of the inner-layer permanent magnet slot and the second end of the outer-layer layer permanent magnet slot gradually increases outwards along the radial direction of the rotor body.

In some embodiments, a thickness of the inner-layer permanent magnet slot at a position where the inner-layer permanent magnet is placed is larger than that of a rest of the inner-layer permanent magnet slot, or a thickness of the outer-layer permanent magnet slot at a position where the outer-layer permanent magnet is placed is larger than a rest of the outer-layer permanent magnet slot; or
a thickness of the inner-layer permanent magnet slot at a position where the inner-layer permanent magnet is placed is larger than that of a rest of the inner-layer permanent magnet slot, and a thickness of the outer-layer permanent magnet slot at a position where the outer-layer permanent magnet is placed is larger than a rest of the outer-layer permanent magnet slot.

According to another aspect of the present disclosure, a permanent magnet assisted synchronous reluctance motor is provided. The motor includes a rotor structure, which is the rotor structure described above.

In some embodiments, the permanent magnet assisted synchronous reluctance motor includes: a stator, wherein a plurality of stator teeth are provided on an inner circumferential surface of the stator, the rotor body is disposed within the stator, the outer-layer permanent magnet is disposed in a middle of the outer-layer permanent magnet slot, a maximum included angle formed between lines connecting both ends of the outer-layer permanent magnet and a center of a shaft hole of the rotor body is θ1, the plurality of stator teeth include a first stator tooth, a second stator tooth, and a third stator tooth that are adjacently arranged sequentially, an extension line of the direct-axis through the outer-layer permanent magnet passes through a geometric center of the second stator tooth in a radial direction, and a maximum included angle formed between the first stator tooth and the third stator tooth is θ2, where θ1<θ2.

According to another aspect of the present disclosure, an electric car is provided. The electric car includes a permanent magnet assisted synchronous reluctance motor, wherein the permanent magnet assisted synchronous reluctance motor is the permanent magnet assisted synchronous reluctance motor described above.

BRIEF DESCRIPTION OF THE DRAWINGS

The accompanying drawings of the description that constitute a part of the present disclosure, are used to provide a further understanding of the present disclosure. The illustrative embodiments of the present disclosure as well as the descriptions thereof, which are used for explaining the present disclosure, do not constitute improper definitions on the present disclosure. In the accompanying drawings.

Among them, the above-described accompanying drawings include the following reference signs:

10: rotor body; 11: inner-layer permanent magnet slot; 12: outer-layer permanent magnet slot; 13: shaft hole; 21: inner-layer permanent magnet; 211: first permanent magnet; 212: second permanent magnet; 22: outer-layer permanent magnet;
31: first magnetic isolation bridge; 32: second magnetic isolation bridge;
40: stator; 41: first stator tooth; 42: second stator tooth; 43: third stator tooth;
50: stator winding.

DESCRIPTION OF THE INVENTION

It should be noted that, in the case without a conflict, the embodiments in the present disclosure and the features in the embodiments may be combined with each other. The present disclosure will be described in detail below with reference to the accompanying drawings and in conjunction with the embodiments.

It is to be noted that the terms used here are only for the purpose of describing particular embodiments, and are not intended to limit the exemplary embodiments according to the present disclosure. As used here, the singular forms are also intended to include plural forms unless otherwise specified additionally in the context. In addition, it should also be understood that when the term "contain" and/or "include" is used in the present specification, it is intended to indicate the presence of features, steps, operations, devices, assemblies, and/or combinations thereof.

It should be noted that the terms "first", "second" and the like in the specification and claims of the present disclosure and the accompanying drawings are used to distinguish similar objects, and are not necessarily used to describe a specific order or sequence. It is to be understood that the terms thus used are interchangeable as appropriate, such that the embodiments of the present disclosure described here can be implemented, for example, in a sequence other than those illustrated or described here. In addition, the terms "include" and "have" as well as any of their deformations are intended to cover a non-exclusive inclusion. For example, the process, method, system, product, or device that contains a series of steps or units is not necessarily limited to those steps or units that are explicitly listed, but may include other steps or units that are not explicitly listed or that are inherent to such processes, methods, products or devices.

For ease of description, spatially relative terms such as "over", "above", "on an upper surface of", "upper", and the like, may be used here to describe the spatial positional relationship of one device or feature shown in the accompanying drawings with other devices or features. It should be understood that, the spatially relative terms are intended to contain different orientations in use or operation in addition to the orientation of the device described in the accompanying drawings. For example, if the device in the accompanying drawings is inverted, the device described to be "above other devices or configurations" or "over other devices or configurations" will be positioned "below other devices or configurations" or "under other devices or configurations". Thus, the exemplary term "above" may include both orientations including "above" and "below". The device may also be positioned in other different manners (rotated 90 degrees or at other orientations), and the relative descriptions of the space used here are interpreted accordingly.

Exemplary embodiments according to the present disclosure will now be described in more detail with reference to the accompanying drawings. However, these exemplary embodiments may be embodied in multiple different forms, and should not be construed as being limited to only the embodiments set forth here. It is to be understood that these embodiments are provided so that the disclosure of the present disclosure will be thorough and complete, and the concept of these exemplary embodiments will be fully conveyed to those skilled in the art. In the accompanying drawings, for the sake of clarity, it is possible to enlarge the thickness of layers and areas, and use the same reference sign to denote the same component, so that the description thereof will be omitted.

A ferrite permanent magnet assisted synchronous reluctance motor is also applied to an electric car in the art known to the inventors. After research, such motor has problems such as much noise, easy demagnetization, and low efficiency.

In view of this, a rotor structure, a permanent magnet assisted synchronous reluctance motor and an electric car are provided to solve the problem of low efficiency of the motor.

In conjunction with the illustrations of FIGS. 1 to 7, according to an embodiment of the present disclosure, a rotor structure is provided.

Figure 1:
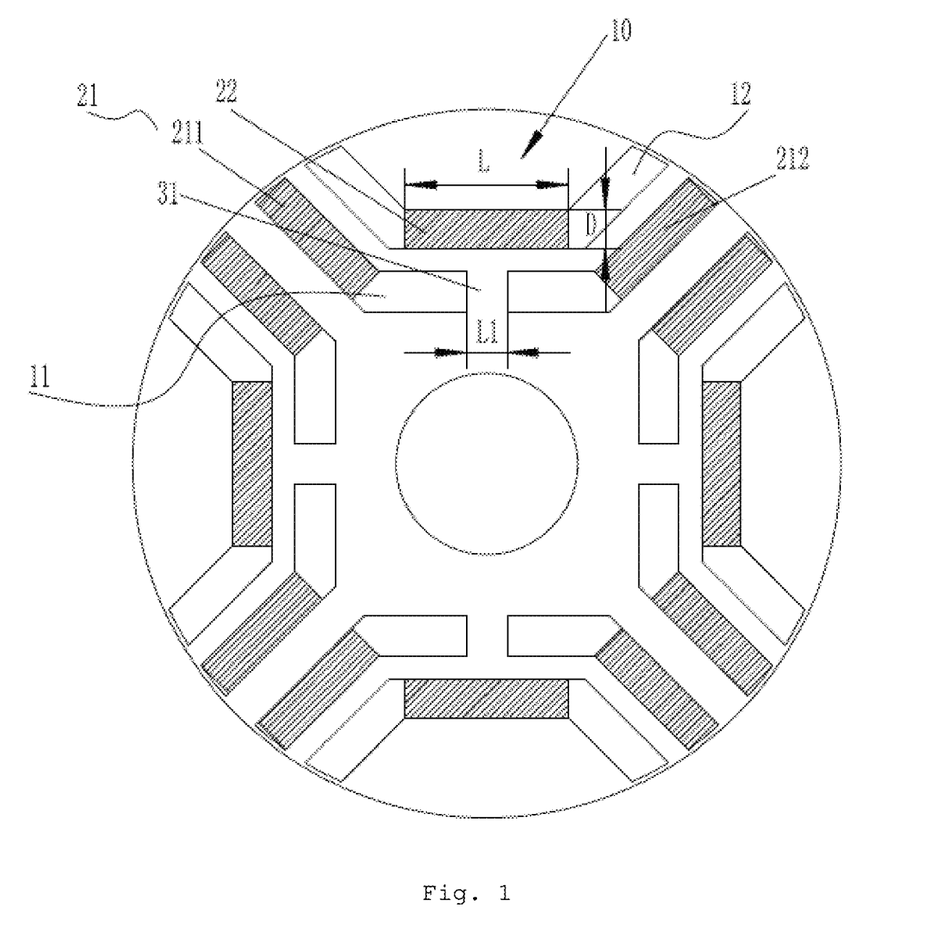
FIG. 1 shows a schematic structural view of a first embodiment of the rotor structure according to the present disclosure.
Figure 2:
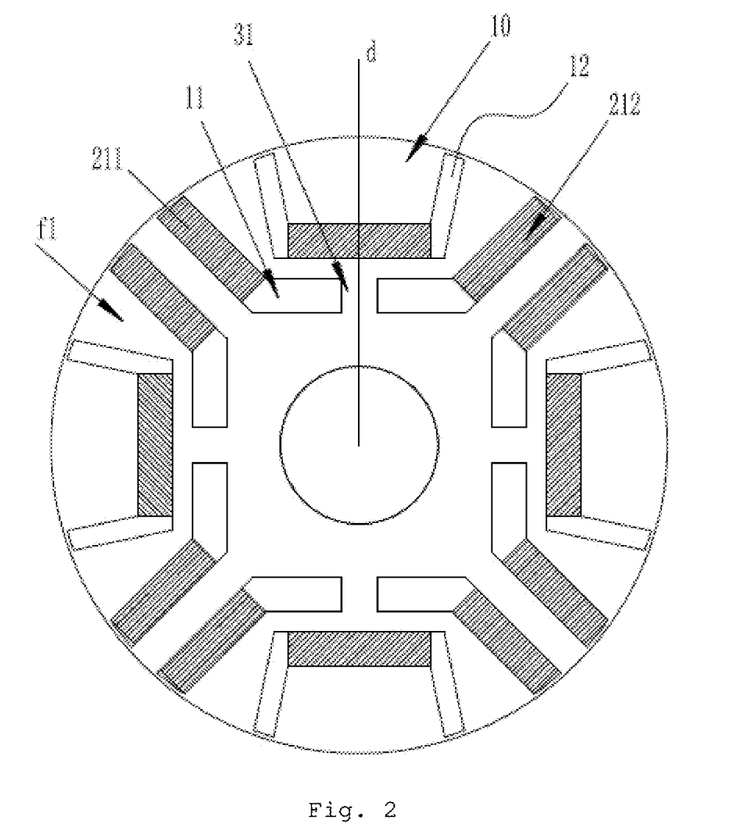
FIG. 2 shows a schematic structural view of a second embodiment of the rotor structure according to the present disclosure.

Specifically, the rotor structure includes a rotor body 10, an inner-layer permanent magnet 21 and an outer-layer permanent magnet 22. The rotor body 10 is opened with a group of permanent magnet slots, which include an inner-layer permanent magnet slot 11 and an outer-layer permanent magnet slot 12. The inner-layer permanent magnet slots 11 and the outer-layer permanent magnet slots 12 are arranged at intervals outwards along a radial direction of the rotor body 10. The inner-layer permanent magnet 21 is disposed within the inner-layer permanent magnet slot 11. The outer-layer permanent magnet 22 is disposed within the outer-layer permanent magnet slot 12, and the inner-layer permanent magnet 21 and the outer-layer permanent magnet 22 are arranged staggeredly.

In the present embodiment, the inner-layer permanent magnet and the outer-layer permanent magnet are arranged staggeredly, which raises an increased magnetic flux of the permanent magnet per unit volume, and increases an output torque of the motor having the rotor structure, thereby improving the efficiency of the motor and reducing the cost of the motor. Moreover, it is possible to enhance the mechanical strength of the rotor structure, and improve the reliability of the motor.

Further, the rotor structure further includes a first magnetic isolation bridge 31. A first end of the first magnetic isolation bridge 31 is connected to a first slot wall of the inner-layer permanent magnet slot 11. A second end of the first magnetic isolation bridge 31 is connected to a second slot wall opposite to the first slot wall of the inner-layer permanent magnet slot 11, and the first magnetic isolation bridge 31 and the outer-layer permanent magnet 22 are arranged oppositely. By such arrangement, it is possible to effectively improve the mechanical strength of the rotor structure.

As shown in FIG. 1, the length of the outer-layer permanent magnet 22 is L, the thickness of the outer-layer permanent magnet 22 along a radial direction is D, and the width of the first magnetic isolation bridge 31 along a length direction of the inner-layer permanent magnet slot 11 is L1, where $0.02 \leq L1/(L \times D) \leq 0.1$. By such arrangement, it is possible to effectively improve the performance of the rotor structure. It can effectively prevent the magnetic isolation bridge from blocking a magnetic flux without producing much flux leakage.

Figure 3:
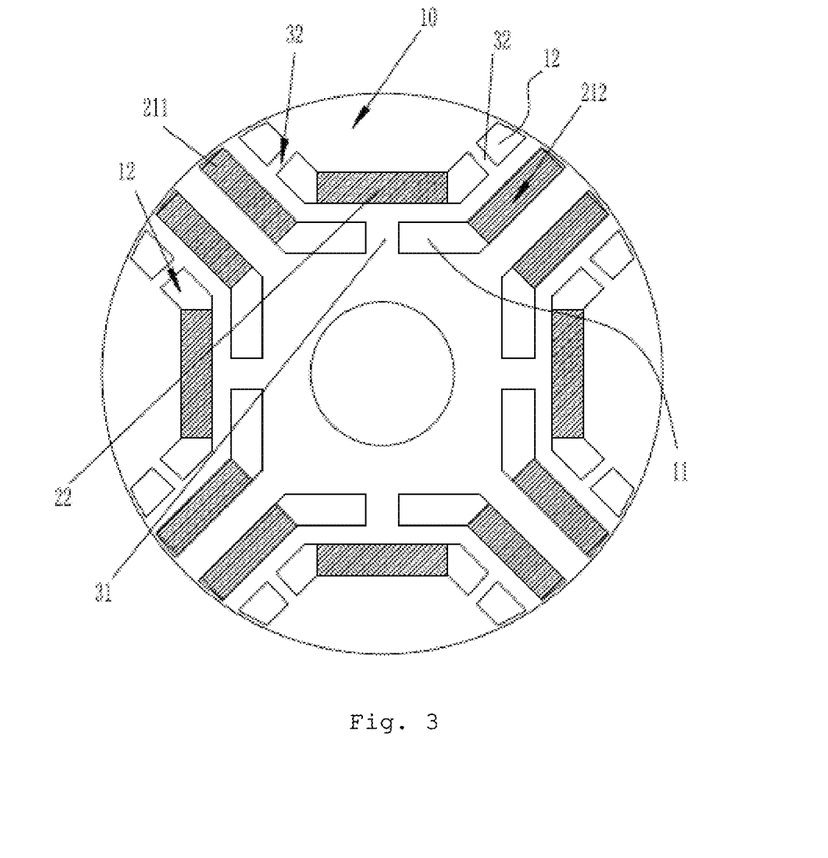
FIG. 3 shows a schematic structural view of a third embodiment of the rotor structure according to the present disclosure.
Figure 4:
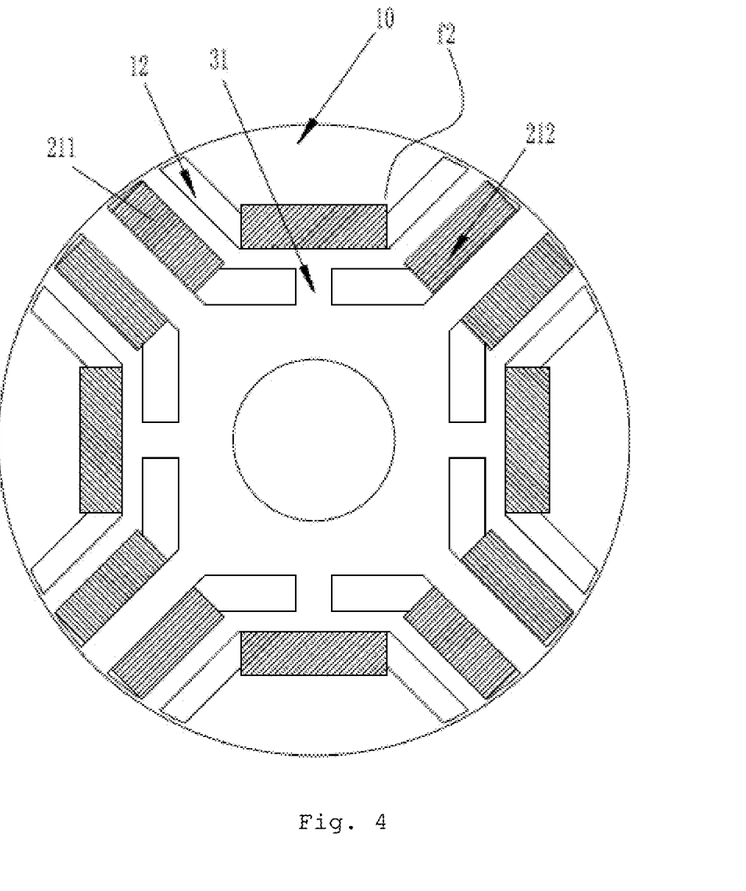
FIG. 4 shows a schematic structural view of a fourth embodiment of the rotor structure according to the present disclosure.

As shown in FIG. 3, the rotor structure further includes a second magnetic isolation bridge 32. The first end of the second magnetic isolation bridge 32 is connected to the third slot wall of the outer-layer permanent magnet slot 12, and the second end of the second magnetic isolation bridge 32 is connected to the fourth slot wall of the outer-layer permanent magnet slot 12 opposite to the third slot wall, such that the second magnetic isolation bridge 32 and the inner-layer permanent magnet 21 are arranged oppositely. By such arrangement, it is possible to further improve the mechanical strength of the rotor structure.

In some embodiments, there are two second magnetic isolation bridges 32, which are respectively disposed within both ends of the outer-layer permanent magnet slot 12. Among them, there are a plurality of groups of permanent magnet slots, which are arranged at intervals along an axial direction of the rotor body 10. In some embodiments, there are two second magnetic isolation bridges 32 provided in the outer-layer permanent magnet slot 12 in each group of permanent magnet slots.

The inner-layer permanent magnet 21 includes a first permanent magnet 211 and a second permanent magnet 212. The first permanent magnet 211 is disposed within the first end of the inner-layer permanent magnet slot 11, and the second permanent magnet 212 is disposed within the second end of the inner-layer permanent magnet slot 11. The first permanent magnet 211 and the second permanent magnet 212 are arranged with a distance therebetween, and the outer-layer permanent magnet 22 is located between the first permanent magnet 211 and the second permanent magnet 212.

The first end and the second end of the inner-layer permanent magnet slot 11 are arranged to extend toward an outer edge of the rotor body 10 along a radial direction of the rotor body 10. The first end of the inner-layer permanent magnet slot 11 and the second end of the inner-layer permanent magnet slot 11 are arranged oppositely and located on both sides of a direct-axis d of the rotor body 10. The first end and the second end of the outer-layer permanent magnet slot 12 extend toward an outer edge of the rotor body 10 along a radial direction of the rotor body 10, and the first end of the outer-layer permanent magnet slot 12 and the second end of the outer-layer permanent magnet slot 12 are arranged oppositely and located on both sides of the direct-axis d. The first end of the inner-layer permanent magnet slot 11 and the first end of the outer-layer permanent magnet slot 12 are arranged adjacently, and the distance between the first end of the inner-layer permanent magnet slot 11 and the first end of the outer-layer permanent magnet slot 12 gradually increases outwards along a radial direction of the rotor body 10, and the distance between the second end of the inner-layer permanent magnet slot 11 and the second end of the outer-layer permanent magnet slot 12 gradually increases outwards along a radial direction of the rotor body 10. Among them, a magnetic conduction channel is formed between the inner-layer permanent magnet slot 11 and the outer-layer permanent magnet slot 12 (as shown in f1 of FIG. 2). When the distance between the inner-layer permanent magnet slot 11 and the outer-layer permanent magnet slot 12 gradually increases, the width of the magnetic conduction channel between the inner-layer permanent magnet slot 11 and the outer-layer permanent magnet slot 12 also gradually increases.

The thickness of the inner-layer permanent magnet slot 11 at a position where the inner-layer permanent magnet 21 is placed is larger than the thickness of a rest of the inner-layer permanent magnet slot 11, and the thickness of the outer-layer permanent magnet slot 12 at a position where the outer-layer permanent magnet 22 (as shown in f2 of FIG. 4) is placed is larger than the thickness of a rest of the outer-layer permanent magnet slot 12. By such arrangement, it is possible to effectively improve the performance of the rotor structure, and at the same time improve the stability of the permanent magnet provided within the permanent magnet slot. It is possible to effectively improve an air-gap magnetic flux of the motor and increase an output torque and efficiency of the motor.

The rotor structure in the above-described embodiment can also be used in the technical field of devices of an electric motor. That is, according to another aspect of the present disclosure, a permanent magnet assisted synchronous reluctance motor is provided. The motor includes a rotor structure, which is the rotor structure in the above-described embodiment.

Figure 5:
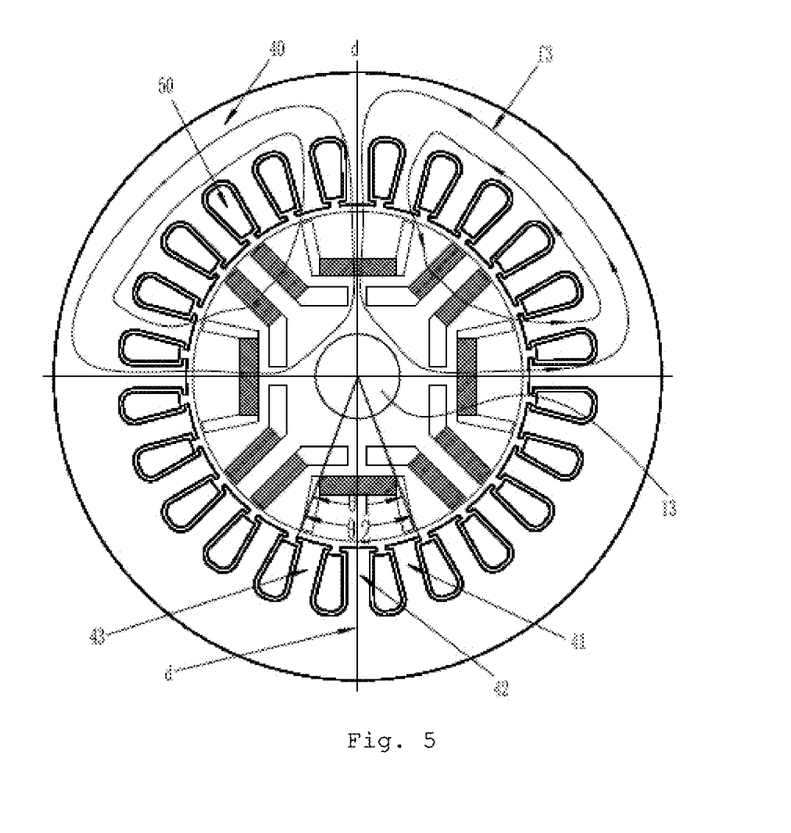
FIG. 5 shows a schematic structural view of a first embodiment of a permanent magnet assisted synchronous reluctance motor according to the present disclosure.
Figure 6:
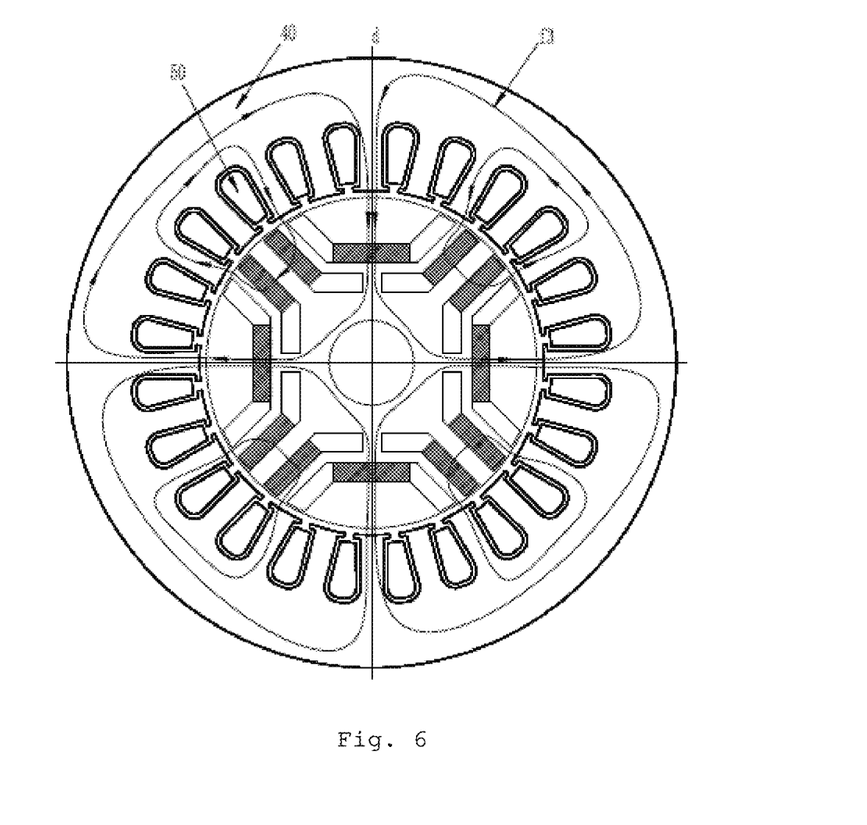
FIG. 6 shows a schematic structural view of a second embodiment of a permanent magnet assisted synchronous reluctance motor according to the present disclosure.
Figure 7:
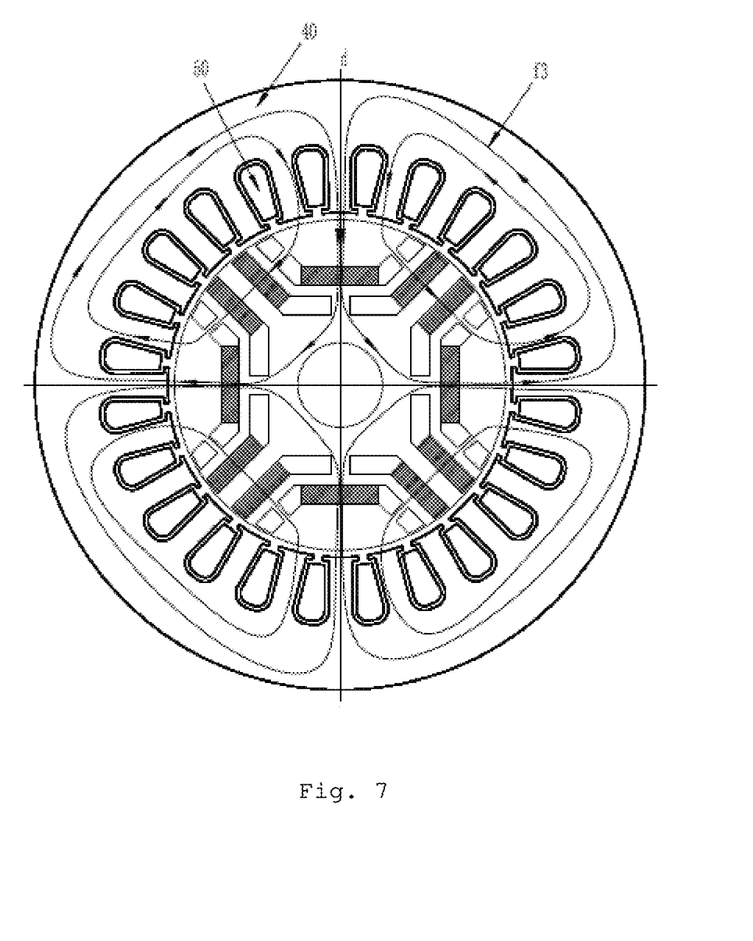
FIG. 7 shows a schematic structural view of a third embodiment of a permanent magnet assisted synchronous reluctance motor according to the present disclosure.

Among them, the permanent magnet assisted synchronous reluctance motor includes a stator 40. A plurality of stator teeth are provided on an inner circumferential surface of the stator 40, the rotor body 10 is disposed within the stator 40, and the outer-layer permanent magnet 22 is disposed in the middle of the outer-layer permanent magnet slot 12. A maximum included angle formed between lines connecting both ends of the outer-layer permanent magnet 22 and a center of the shaft hole 13 of the rotor body 10 is θ1, and the plurality of stator teeth include a first stator tooth 41, a second stator tooth 42, and a third stator tooth 43 which are adjacently arranged sequentially. An extension line of the direct-axis through the outer-layer permanent magnet 22 passes through a geometric center of the second stator tooth 42 in a radial direction. A maximum included angle formed between the first stator tooth 41 and the third stator tooth 43 is θ2, where θ1<θ2. By setting θ1 to be less than θ2, it is possible to maximize a magnetic flux generated by the inner-layer permanent magnet, and increase an output torque and efficiency of the motor.

The permanent magnet assisted synchronous reluctance motor in the above-described embodiment can also be used in the technical field of devices of an electric car. That is, according to another aspect of the present disclosure, an electric car is provided, which includes a permanent magnet assisted synchronous reluctance motor. The permanent magnet assisted synchronous reluctance motor is the permanent magnet assisted synchronous reluctance motor in the above-described embodiment.

Specifically, the rotor of the motor raises a saliency ratio of the motor and increases a reluctance torque of the motor by using multiple layers of permanent magnets. Compared with the known to the inventors permanent magnet synchronous motors, it is possible to significantly increase a torque density of the motor, and the amount of permanent magnets used in the motor can also increase significantly.

With the rotor structure in the present disclosure, it is possible to significantly reduce the amount of permanent magnets used, and maintain a substantially constant efficiency of the motor. In particular, the present disclosure relates to a permanent magnet assisted synchronous reluctance motor (hereinafter referred to as the motor) applied to an electric car.

The electric motor includes a stator, a stator winding 50 and a rotor. The rotor contains a slot for placing a permanent magnet and the permanent magnet placed in the slot. The rotor contains multiple layers of permanent magnets in the same magnetic pole, which have the same polarity in a direction towards the stator.

In the same magnetic pole, the permanent magnets in the inner-layer permanent magnet slot of the rotor are placed on both sides of the permanent magnet slot, the permanent magnets in the outer-layer permanent magnet slot are placed in the middle of the permanent magnet slot, and a magnetic isolation bridge is provided at a position where the inner-layer permanent magnet slot is opposite to an outer-layer permanent magnet.

By placing the inner-layer permanent magnet on both sides, placing the outer-layer permanent magnets at a middle position, and providing a magnetic isolation bridge at a position where the inner-layer permanent magnet slot is opposite to the outer-layer permanent magnet, it is possible to effectively improve a magnetic circuit of a permanent magnet field, and reduce a magnetic induction line blocked by the permanent magnet slot. The distribution view of the magnetic induction line f3 of the rotor is shown in FIG. 6, it is possible to greatly improve a magnetic flux generated by the permanent magnets per unit volume and increase the utilization rate of the permanent magnets. By setting a magnetic isolation bridge, it is also possible to reduce the concentration of stress on the magnetic isolation bridge at an extremity of the permanent magnet slot and increase the mechanical strength of the rotor when the rotor rotates at high speed.

Since the inner-layer and outer-layer permanent magnets within the same magnetic pole of the rotor are not opposite to each other, it is possible to reduce the coincidence degree of the magnetic induction lines of the inner-layer and outer-layer permanent magnets and increase an effective magnetic flux of the permanent magnets.

A magnetic isolation bridge is provided at a position where the outer-layer permanent magnet slot is opposite to the inner-layer permanent magnet. It is possible to effectively increase the utilization rate of inner-layer permanent magnet. As shown in FIG. 7, in some embodiments, the flux linkage line of the inner-layer permanent magnet links more windings to produce a greater flux linkage of the stator and improve the efficiency of the motor.

A magnetic conduction channel is formed between the inner and outer-layer permanent magnet slots of the rotor, wherein the thickness of the magnetic conduction channel proximate to both sides has a shape that gradually widens from the inside to the outside. By approaching the bridge arm of the outer-layer permanent magnet to the d-axis as much as possible, it is possible to effectively reduce the magnetic induction line of the permanent magnet blocked by the bridge arm. The distribution view of the magnetic induction line f3 of the electric motor is shown in FIG. 5. It is possible to increase the amount of windings of the stator linked by the magnetic induction line, thereby producing greater flux linkage of the stator and improve the efficiency of the motor.

In addition to the above-described, it should also be noted that "one embodiment", "another embodiment", "an embodiment" and the like referred to in the present specification mean that specific features, structures or characteristics described in conjunction with the embodiment are included in at least one embodiment generally described in the present disclosure. The same definition appearing in multiple places in the specification does not certainly refer to the same embodiment. Furthermore, when a particular feature, structure, or characteristic is described in conjunction with any embodiment, it is claimed that the implementations of such feature, structure, or characteristic in conjunction with other embodiments are also included in the scope of the present disclosure.

In the above-described embodiments, the descriptions of the various embodiments are focused differently, and for the parts that are not described in detail in a certain embodiment, it is possible to refer to the related descriptions of other embodiments.

The foregoing descriptions are only alternative embodiments of the present disclosure, but do not serve to limit the present disclosure. For those skilled in the art, various modifications and changes may be made in the present disclosure. Any amendment, equivalent replacement, improvement, and the like made within the spirit and principles of the present disclosure should all be contained within the protection scope of the present disclosure.

What is claimed is:

1. A rotor structure, comprising:
    a rotor body opened with a group of permanent magnet slots, wherein the group of permanent magnet slots comprise an inner-layer permanent magnet slot and an outer-layer permanent magnet slot which are arranged at intervals outwards along a radial direction of the rotor body;
    an inner-layer permanent magnet disposed within the inner-layer permanent magnet slot;
    an outer-layer permanent magnet disposed within the outer-layer permanent magnet slot, wherein the inner-layer permanent magnet and the outer-layer permanent magnet are arranged staggeredly;
    wherein a first end and a second end of the inner-layer permanent magnet slot are arranged to extend toward an outer edge of the rotor body along a radial direction of the rotor body, the first end of the inner-layer permanent magnet slot and the second end of the inner-layer permanent magnet slot are arranged oppositely and located on both sides of a direct-axis of the rotor body, a first end and a second end of the outer-layer permanent magnet slot are arranged to extend toward the outer edge of the rotor body along the radial direction of the rotor body, the first end of the outer-layer permanent magnet slot and the second end of the outer-layer permanent magnet slot are arranged oppositely and located on both sides of the direct-axis, the first end of the inner-layer permanent magnet slot and the first end of the outer-layer permanent magnet slot are arranged adjacently, the second end of the inner-layer permanent magnet slot and the second end of the outer-layer permanent magnet slot are arranged adjacently, and
    a distance between the first end of the inner-layer permanent magnet slot and the first end of the outer-layer permanent magnet slot gradually increases outwards along the radial direction of the rotor body, or a distance between the second end of the inner-layer permanent magnet slot and the second end of the outer-layer permanent magnet slot gradually increases outwards along the radial direction of the rotor body; or
    the distance between the first end of the inner-layer permanent magnet slot and the first end of the outer-layer permanent magnet slot gradually increases outwards along the radial direction of the rotor body, and the distance between the second end of the inner-layer permanent magnet slot and the second end of the outer-layer permanent magnet slot gradually increases outwards along the radial direction of the rotor body.

2. The rotor structure according to claim 1, wherein the rotor structure further comprises:
    a first magnetic isolation bridge, wherein a first end of the first magnetic isolation bridge is connected to a first slot wall of the inner-layer permanent magnet slot, a second end of the first magnetic isolation bridge is connected to a second slot wall of the inner-layer permanent magnet slot opposite to the first slot wall, and the first magnetic isolation bridge and the outer-layer permanent magnet are arranged oppositely.

3. The rotor structure according to claim 2, wherein a length of the outer-layer permanent magnet is L, a thickness of the outer-layer permanent magnet along a radial direction is D, and a width of the first magnetic isolation bridge along a length direction of the inner-layer permanent magnet slot is L1, where $0.02 \leq L1/(L \times D) \leq 0.1$.

4. The rotor structure according to claim 1, wherein the rotor structure further comprises:
    a second magnetic isolation bridge, wherein a first end of the second magnetic isolation bridge is connected to a third slot wall of the outer-layer permanent magnet slot, a second end of the second magnetic isolation bridge is connected to a fourth slot wall of the outer-layer permanent magnet slot opposite to the third slot wall, and the second magnetic isolation bridge and the inner-layer permanent magnet are arranged oppositely.

5. The rotor structure according to claim 4, comprising two second magnetic isolation bridges, which are respectively disposed within both ends of the outer-layer permanent magnet slot.

6. The rotor structure according to claim 1, wherein the inner-layer permanent magnet comprises:
    a first permanent magnet disposed within a first end of the inner-layer permanent magnet slot;
    a second permanent magnet disposed within a second end of the inner-layer permanent magnet slot, wherein the first permanent magnet and the second permanent magnet are arranged with a distance therebetween, and the outer-layer permanent magnet is located between the first permanent magnet and the second permanent magnet.

7. The rotor structure according to claim 1, wherein a thickness of the inner-layer permanent magnet slot at a position where the inner-layer permanent magnet is placed is larger than that of a rest of the inner-layer permanent magnet slot, or a thickness of the outer-layer permanent magnet slot at a position where the outer-layer permanent magnet is placed is larger than a rest of the outer-layer permanent magnet slot; or
    the thickness of the inner-layer permanent magnet slot at the position where the inner-layer permanent magnet is placed is larger than that of the rest of the inner-layer permanent magnet slot, and the thickness of the outer-layer permanent magnet slot at the position where the outer-layer permanent magnet is placed is larger than the rest of the outer-layer permanent magnet slot.

8. A permanent magnet assisted synchronous reluctance motor, comprising a rotor structure, wherein the rotor structure is the rotor structure according to claim 1.

9. The permanent magnet assisted synchronous reluctance motor according to claim 8, wherein the permanent magnet assisted synchronous reluctance motor comprises:
    a stator, wherein a plurality of stator teeth are provided on an inner circumferential surface of the stator, the rotor body is disposed within the stator, the outer-layer permanent magnet is disposed in a middle of the outer-layer permanent magnet slot, a maximum included angle formed between lines connecting both ends of the outer-layer permanent magnet and a center of a shaft hole of the rotor body is $\theta 1$, the plurality of stator teeth comprise a first stator tooth, a second stator tooth, and a third stator tooth that are adjacently arranged sequentially, an extension line of a direct-axis through the outer-layer permanent magnet passes through a geometric center of the second stator tooth in a radial direction, and a maximum included angle formed between the first stator tooth and the third stator tooth is θ2, where θ1<θ2.

10. An electric car, comprising a permanent magnet assisted synchronous reluctance motor, wherein the permanent magnet assisted synchronous reluctance motor is the permanent magnet assisted synchronous reluctance motor according to claim 8.

* * * * *